(No Model.)
W. H. HAW.
FRUIT PICKER.
No. 517,041.  Patented Mar. 27, 1894.
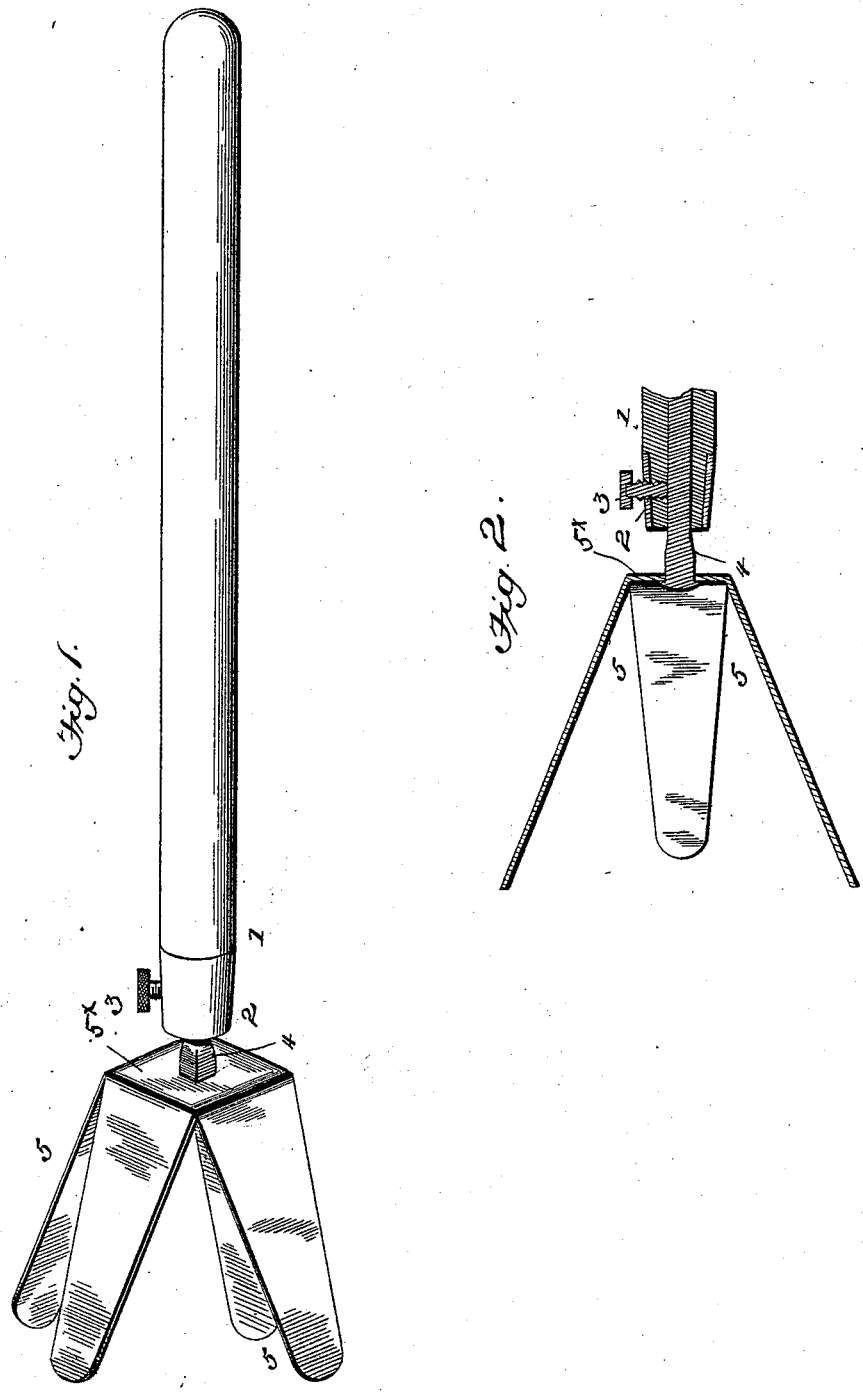
Witnesses
Inventor
William H. Haw
By John Wedderburn
his Attorney

United States Patent Office.

WILLIAM H. HAW, OF FIELD'S LANDING, CALIFORNIA.

FRUIT-PICKER.

SPECIFICATION forming part of Letters Patent No. 517,041, dated March 27, 1894.

Application filed June 17, 1893. Serial No. 477,966. (No model.)

*To all whom it may concern:*

Be it known that I, WILLIAM H. HAW, a citizen of the United States, and a resident of Field's Landing, in the county of Humboldt and State of California, have invented certain new and useful Improvements in Fruit-Pickers; and I do hereby declare the following to be a full, clear, and exact description of the invention, such as will enable others skilled in the art to which it appertains to make and use the same.

This invention relates to fruit-pickers, and has for its object to provide means for facilitating the gathering of fruit without bruising or in any way injuring the same, and at varying elevations.

With this and other objects in view, the invention consists of the construction and arrangement of the several parts, as will be more fully hereinafter described and claimed.

In the drawings: Figure 1 is a perspective view of the improved picker. Fig. 2 is a transverse vertical section of the same.

Similar numerals of reference are employed to designate corresponding parts in both figures of the drawings.

Referring to the drawings, the numeral 1 designates a tubular wooden handle, provided with a metallic ferrule 2 at the upper end thereof in which is mounted a set screw 3. Within the said tubular handle is adjustably mounted a rod or stem 4, preferably constructed of steel and capable of considerable adjustment. The said rod or stem when adjusted in the handle 1, is held in its adjusted position by the set screw 3, which is clamped thereagainst as will be readily understood. On the upper end of the said rod or stem is mounted a cup-shaped receptacle, consisting of four oppositely disposed arms 5, constructed of yielding metal and converging toward the bottom or the point where they join the said rod or stem 4. The said cup-shaped receptacle is struck up from a piece of sheet metal and is formed with a flattened base 5× from which extends the arms 5 which are also flat and meet each other at the said base. The said arms are yielding as stated and their upper ends are blunt in order to avoid penetrating the fruit as it drops, and the widened arms obviating scoring or tearing of the fruit as it drops into the receptable.

In using the herein described device, the rod or stem 4 is first adjusted, to the desired height, and the cup-shaped receptacle is raised and caused to surround the fruit, and thus plucked. The yielding arms composing the receptacle, prevent bruising or injury to the fruit, and after the fruit has become lodged within the said receptacle it is lowered and deposited as may be found desirable. It will be observed that the upper divergent portions of the arms permit the entrance of the fruit into the cup-shaped receptacle without striking the said ends, and this arrangement also provides for the effectual gathering of various sizes of fruit by one and the same device.

This device is especially intended for gathering fruits of a delicate nature which would be materially injured by being permitted to drop any distance whatsoever, and in operation is placed up under the fruit so that the latter will have no fall whatsoever.

It is obviously apparent that many minor changes, within the scope of the appended claim, might be made and substituted for those shown, without departing from the nature or spirit of the invention.

Having thus described the invention, what is claimed as new is—

In a fruit picker, the combination of a tubular handle having a set screw in connection with the upper end thereof, a rod or stem adjustably mounted in said handle and adapted to be held in its adjusted position by said set screw, and a cup-shaped receptacle on the upper end of said rod or stem formed of sheet metal and having a flat base with upwardly extending integral divergent arms which are flat and broadened and meet at the said base and have outer blunt ends, said arms being yielding, substantially as described.

In testimony whereof I have signed this specification in the presence of two subscribing witnesses.

WILLIAM H. HAW.

Witnesses:
 A. T. CRANE,
 GEORGE D. MURRAY.